June 14, 1966 R. V. BAYLISS 3,256,008
ARTICLE LOADING DEVICES
Filed Aug. 26, 1964 3 Sheets-Sheet 1
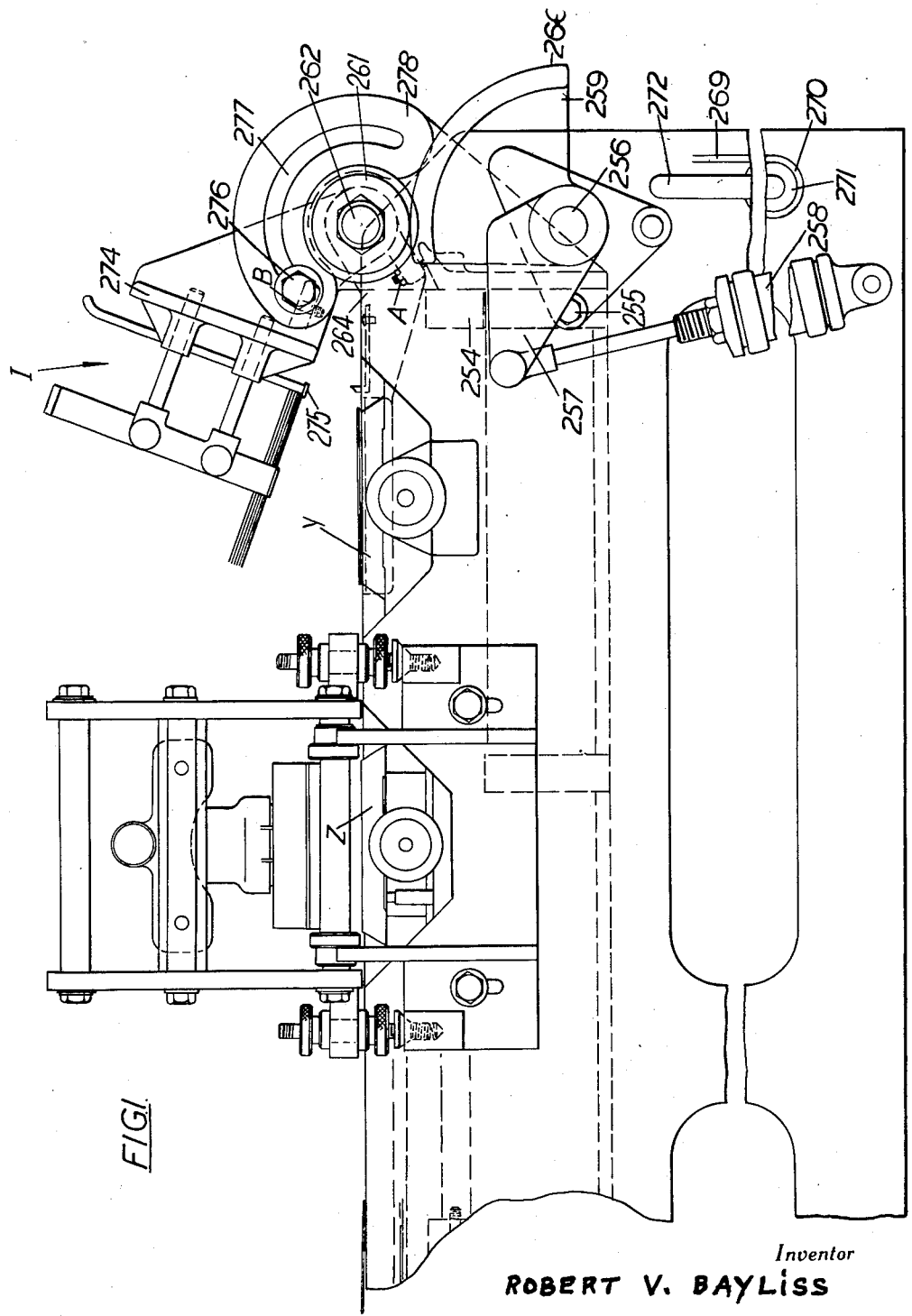
Inventor
ROBERT V. BAYLISS
By *Imirie & Smiley*
Attorney

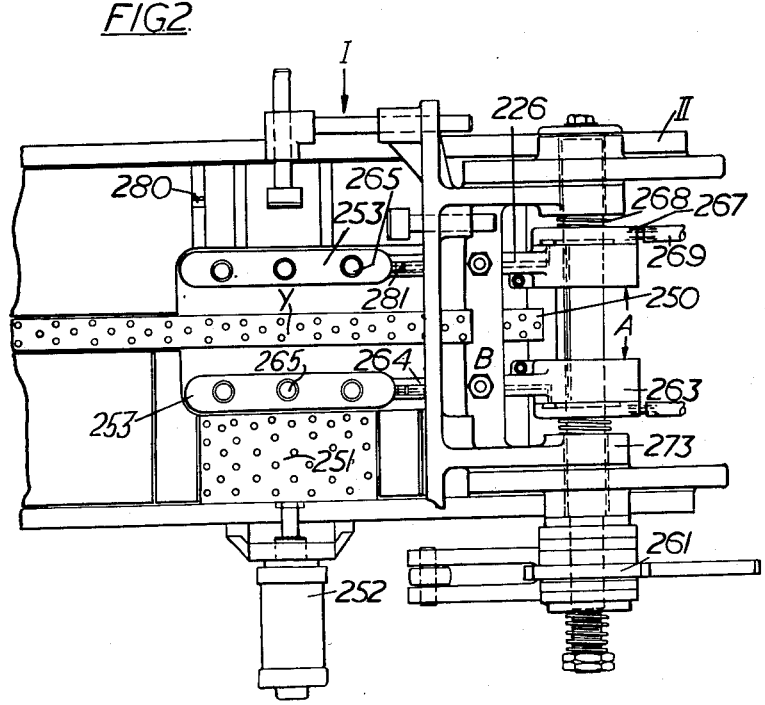

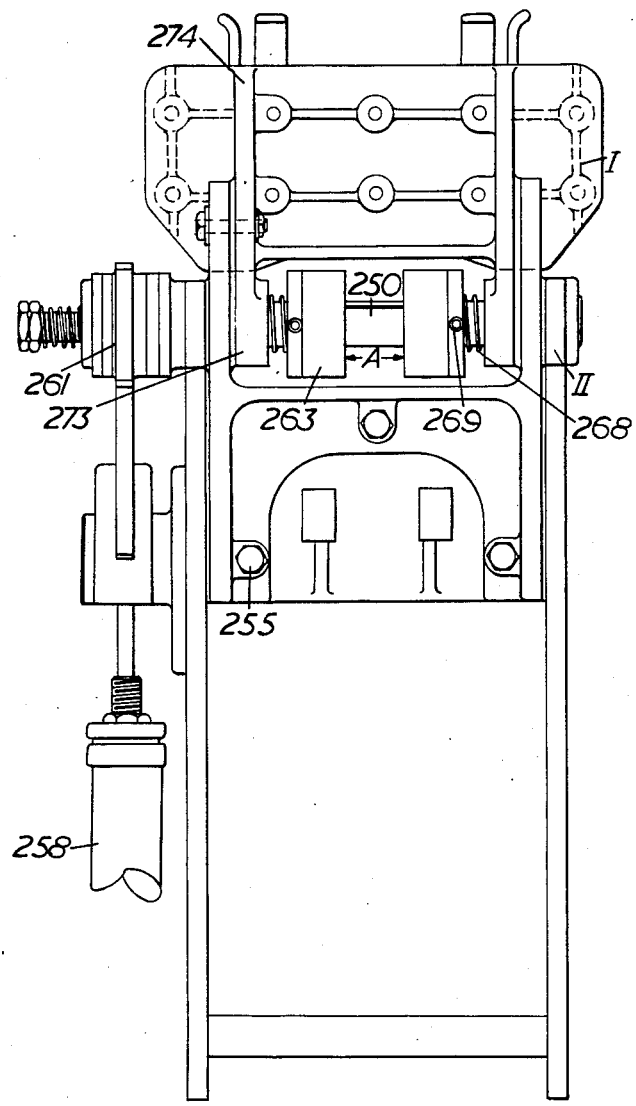

United States Patent Office 3,256,008
Patented June 14, 1966

3,256,008
ARTICLE LOADING DEVICES
Robert Vivian Bayliss, Holmer Green, near High Wycombe, England, assignor to Stilex Printing Limited, London, England, a corporation of Great Britain
Filed Aug. 26, 1964, Ser. No. 392,189
Claims priority, application Great Britain, Aug. 28, 1963, 34,081/63
7 Claims. (Cl. 271—32)

This invention relates to article loading devices and more particularly to feeding articles from a magazine to the loading station of a machine.

In British co-pending patent application No. 18,138/62 there is described a transfer apparatus by which plate-like articles are fed from a loading station to a working station, such as the bed of a screen printing machine, the articles being fed forward by a moving bed part against which they are held by suction through apertures in the bed part during the feeding operation. In such a transfer apparatus it is desirable to load the articles into a magazine whence they can be fed in succession to the moving bed part at the loading station and preferably for them to be located accurately at the loading station.

The main object of the present invention is to provide a loading device by which articles, such as plate-like articles, may be fed from a magazine to a machine loading station and preferably accurately located at the loading station so that they are correctly positioned for the operation of the machine of which the loading station forms part.

According to the present invention a loading device for feeding articles in succession to a loading station of a machine, comprises a frame, a magazine pivotally mounted in the frame, a measuring device to fix the magazine in the frame at a predetermined position with respect to the loading station, load supports disposed at the loading station, at least one feed arm pivotally mounted on the frame coaxially with the magazine and movable between the loading station and the magazine, suction means on each feed arm and having means for connection to a source of suction, a driven actuating device to move the feed arms, and a control device operable in timed relation to the actuating device to cause suction to be applied to the feed arm suction means to attract an article thereto from the magazine and deposit it on the load supports.

In a preferred construction, in the loading station each feed arm is disposed with its article supporting surface substantially flush with the article support. Preferably the article support includes a plate-like surface having a plurality of apertures therein through which suction can be applied to hold the articles thereon, the control device being operable to cause suction to be applied to such apertures in timed relation to the movement of each feed arm, a device operable in timed relation to each feed arm to move the article support when an article is supported thereon to locate the article accurately in one direction with respect to the frame of the loading device. Moreover a second article support may be disposed in the frame and movable at right angles to the first article support and provided with suction apertures for holding articles thereon, means being provided to move the second support to locate each article thereon accurately with respect to the frame of the loading device in a direction at right angles to that of the first support.

The drive to each feed arm preferably includes a rotatable element having an arcuate drive surface in frictional driving contact with an arcuate member on a shaft forming the pivot to which each feed arm is secured, the rotatable element being rotated by a crank reciprocated by a hydraulic or like device changes in the fluid pressure in which are effected by actuation of the control device in timed relation to the application of suction to each feed arm. Each feed arm may be pivoted to a shaft journalled in the frame and on which the magazine is mounted, the feed arm journal including a rotary valve device through which the source of suction is connected, a duct leading from the valve through the arm to the suction hole or holes therein.

The frame preferably includes a bracket perpendicular to the pivotal axis of the magazine and the magazine carries a guide member movable in an arcuate slot in the bracket concentric with the magazine pivot, locking means being provided on the said guide member and operable to secure the magazine at will at a selected position with respect to said bracket.

In order that the invention may be more fully understood an embodiment in accordance therewith will now be described by way of example with reference to the drawings accompanying the provisional specification in which:

FIG. 1 is a side elevation of a machine, shown by example as a transfer apparatus for a printing machine as described in British co-pending patent application No. 18,138/62; incorporating a loading device of the present invention;

FIG. 2 is a plan view of the machine shown in FIG. 1; and

FIG. 3 is an end elevation of the machine shown in FIGS. 1 and 2 from the point "X" looking in the direction of the arrow.

The same references are used in all the figures to designate the same parts.

Referring to FIGS. 1–3, these show a loading device by which the articles to be printed, particularly thin sheet articles, can be fed one by one to the loading station I of the machine and there collected by a moving bed part Y and transferred to the printing position over fixed bed parts Z (as described in No. 18,138/62).

The moving bed part Y is provided with a rearwardly extending portion 250, having apertures therein through which suction can be applied in the same manner as to the moving and fixed bed parts Y, Z, e.g., by freely disposed balls in apertures to which suction is applied.

At the loading station I movable article supports 251 are disposed one either side of the moving bed part which forms a second article support and slidable in the frame 254 of the loading device through the action of an hydraulic cylinder 252 for the purpose to be described. The supports 251 are spaced from the moving bed part Y and between them pivoted suction feed arms 253 are normally located to be flush therewith or slightly below them.

On the end of the machine frame the loading device frame 254 is secured, as by bolts 255, and this frame carries a pivot pin 256 on which is mounted at one side of the machine an arm 257 capable of being rotated by a hydraulic cylinder 258 about the pivot 256; the arm 257 has a quadrant 259 fixed with respect thereto, which has an arcuate surface 260 in frictional engagement with a roller 261 freely mounted on a shaft 262 journalled in the frame 254 across the machine, so that when the cylinder 258 is operated, the quadrant 259 is rotated thereby causing the shaft 262 to rotate but means of the frictional contact in the drive a slip will occur, should the shaft 262 come up against a strong restraining force such as might occur if an article becomes wedged in the machine.

Fixed to the shaft are bushes 263 carrying arms 264 on the ends of which are fixed the suction arms 253. These arms have flat upper surfaces in which there are apertures 265, three such apertures being shown, but any appropriate number may be used, and these apertures communicate through ducts 266 with the arms 264 with rotary valves 267 mounted on the shaft 262 and held against the bushes 263 by springs 268. The valves 267 are supplied with suction through flexible pipes 269 connectable to the suction source of the whole machine. As seen in FIG. 1, the pipes 269 have a loop which runs round a pulley 271, riding in a slot 272, as described for the transfer apparatus in application No. 18,148/62.

Also mounted on the shaft 262 are brackets 273, carrying a frame 274, comprising the magazine in which the articles to be fed are supported. This frame has small feet 275 at its lower end, which hold the articles by gravity, but any conventional spring loading or other means may be supplied with the magazine to press the articles to the stops 275.

It will be observed in FIG. 1 that the base of the magazine is at an angle of 30° to the bed 251, but it may be at any angle and this can be adjusted by means of the bolt 276 secured to the arms 273 and passing through the slot 277 in a quadrant 278 fixed to the frame and having its centre co-axial with the shaft 262. The length of the slot 277 is such that the magazine may in fact be disposed as shown in dotted lines in FIG. 1 in the inverted position at the end of the machine and then it will be necessary to include in the magazine means for pressing the articles to be fed upwards against the stops 275, which then appear at the top of the magazine. This last construction is particularly useful where the articles to be fed are of a solid nature such as metal plates which would tend to overlap the magazine loaded above the bed in the position shown in FIG. 1.

A control device, not shown, is provided, which co-ordinates the movement of the cylinder 252 with the cylinder 258 and in turn with the other suction apparatus of the machine, including that of the transfer apparatus of No. 18,138/62. The control of this feed device may be either hand-operated or automatically operated. When it is hand-operated, the machine can be set up by moving the aforesaid moving parts so that they all move in a predetermined sequence matched to the sequence of operation of the transfer apparatus and the printing device of No. 18,138/62. When automatic operation is employed, the machine as a whole automatically feeds the articles in succession from the magazine onto the supports 251 and thence by the moving bed part Y to the printing position and after printing, they are fed out of the machine.

To feed the articles from the magazine, the control device is operated to actuate the cylinder 258, so that the frame 257 is rotated anti-clockwise in FIG. 1, thereby rotating the shaft 262 and hence the arms 264 in a clockwise direction until the suction device 253 engages the lowermost article in the magazine. The cylinder 258 is then reversed and the arms 253 move downwardly, the suction being applied to the apertures 265, so that the lowermost article is extracted from the magazine and lowered onto the supports 251. It is, however, desirable accurately to locate the articles in this position and in FIGS. 1 and 2 there are seen stops 280 and 281, against which the articles must be placed for accurate location. As soon as the article has been placed on the support 251, the moving support Y, by moving to the right in FIGS. 1 and 2, with the suction applied to its apertures, will engage the articles and since the suction at 265 is disconnected, the articles will be moved into contact with the stops 281. The suction is then cut from the moving support Y and applied to the bed part 251, at which point the cylinder 252 moves the bed 251 transversely of the machine, carrying the article across the machine until it engages the stops 280. The suction to the apertures in the support 251 is then cut and the cylinder 252 returns that support to the position shown in FIG. 2, the suction at the same time being applied to the moving support Y which then takes the articles forward to the printing position.

What I claim is:

1. A loading device for feeding articles in succession to a loading station of a machine, comprising a frame, a magazine mounted on a pivot in the frame, a securing device to fix the magazine in the frame at a predetermined position with respect to the loading station, at least one article support disposed at the loading station, at least one feed arm pivotally mounted on the frame coaxially with the magazine and movable between the loading station and the magazine, suction means on each feed arm, a source of suction connected to each suction means, a driven actuating device operable to move the feed arms, and a control device operable in timed relation to the actuating device to cause suction from said source to be applied to said suction means to attract an article thereto from the magazine and means to release said suction to deposit said article on an article support.

2. A device according to claim 1, wherein in the loading station each feed arm is disposed with its article supporting surface substantially flush with an article support.

3. A device according to claim 1, wherein in the loading station each feed arm is disposed with its article supporting surface substantially flush with an article support, each article support includes a plate-like surface, said surface having a plurality of apertures therein through which suction can be applied to hold the articles thereon, said control device being operable to cause suction to be applied through said apertures in timed relation to the movement of each said feed arm, and a device operable in timed relation to each said feed arm to move each said article support when an article is supported thereon to locate the article accurately in one direction with respect to the frame of the loading device.

4. A loading device for feeding articles in succession to a loading station of a machine, comprising a frame, a magazine pivotally mounted in the frame, a securing device to fix said magazine in said frame at a predetermined position with respect to said loading station, a plurality of article supports having apertured supporting surfaces through which suction may be applied to hold articles thereon disposed in the frame, one of said supports being movable at right angles to the remaining supports, means to move said one support to locate each article thereon accurately with respect to the frame of the loading device in a direction at right angles to that of said remaining supports, at least one feed arm pivotally mounted on said frame coaxially with said magazine each feed arm being movable between the loading station and the magazine, suction means on each feed arm and a source of suction connected to each suction means, a driven actuating device to move the feed arms, and a control device operable in timed relation to the actuating device to cause suction to be applied to the feed arm suction means to attract an article thereto from the magazine and deposit it on an article support, and to co-ordinate application of suction to the feed arm suction means and the apertured article supports.

5. A device according to claim 4 including an actuating device for each feed arm, said device including a rotatable element having an arcuate drive surface, a shaft forming a pivot to which each feed arm is secured, said shaft having an arcuate member attached thereto, said arcuate drive surface being in frictional driving contact with said shaft arcuate member, a crank whereby said rotatable element is rotated, said crank being reciprocated by a hydraulic device, actuation of said hydraulic device being effected by said control device in timed relation to the application of suction to each said feed arm.

6. A device according to claim 4 including a shaft journalled in the frame and on which each feed arm and the magazine are mounted, a rotary valve device in each feed arm journal, a duct leading from the valve through the feed arm to said suction means on the feed arm, suction being applied through the rotary valve and thence through the suction means.

7. A loading device for feeding articles in succession to a loading station of a machine, comprising a frame, a magazine mounted on a pivot in the frame, a securing device to fix said magazine on said frame at a predetermined position with respect to said loading station, said frame including a bracket perpendicular to the pivotal axis of said magazine and having an arcuate slot therein concentric with said magazine pivot, a guide member carried by said magazine and movable in said bracket slot, said guide member having locking means operable to secure said magazine at will at a selected position with respect to said bracket, at least one article support disposed at the loading station, at least one feed arm pivotally mounted on the frame coaxially with the magazine and movable between the loading station and the magazine, suction means on each feed arm, a source of suction connected to each suction means, a driven actuating device operable to move the feed arms, and a control device operable in timed relation to the actuating device to cause suction from said source to be applied to said suction means to attract an article thereto from the magazine and means to release said suction to deposit said article on an article support.

References Cited by the Examiner

UNITED STATES PATENTS

| | | | |
|---|---|---|---|
| 2,598,150 | 5/1952 | Wethe et al. | 271—14 |
| 2,630,260 | 3/1953 | Tracy | 271—32 XR |
| 3,091,362 | 5/1963 | Robinson | 221—36 |

MARVIN A. CHAMPION, *Primary Examiner.*